United States Patent
Bates et al.

(10) Patent No.: US 6,497,453 B2
(45) Date of Patent: Dec. 24, 2002

(54) FRAME AND SEAT SUPPORT FOR A RIDING LAWN MOWER

(75) Inventors: Ray G. Bates, Kingston Springs, TN (US); John A. Burns, Franklin, TN (US); Robert M. DeWeese, Franklin, TN (US)

(73) Assignee: Murray, Inc., Brentwood, TN (US)

(*) Notice: Subject to any disclaimer, the term of this patent is extended or adjusted under 35 U.S.C. 154(b) by 0 days.

(21) Appl. No.: 09/922,117

(22) Filed: Aug. 3, 2001

(65) Prior Publication Data

US 2002/0030390 A1 Mar. 14, 2002

Related U.S. Application Data

(60) Provisional application No. 60/224,215, filed on Aug. 10, 2000.

(51) Int. Cl.⁷ .................................................. B60N 2/38
(52) U.S. Cl. .................... 297/188.1; 297/335; 297/336; 280/781
(58) Field of Search ....................... 280/781; 297/188.1, 297/335, 336

(56) References Cited

U.S. PATENT DOCUMENTS

| | | | | |
|---|---|---|---|---|
| 3,038,288 A | | 6/1962 | Deptula | 56/25.4 |
| 3,453,025 A | * | 7/1969 | Grant | 297/188.1 |
| 3,827,747 A | * | 8/1974 | Cookes | 297/335 |
| 4,311,205 A | * | 1/1982 | Goodacre et al. | 297/188.1 |
| 4,364,602 A | * | 12/1982 | Rigazio | 297/335 X |
| 4,565,407 A | * | 1/1986 | Brautigam | 297/335 |
| 4,696,508 A | * | 9/1987 | Brautigam | 297/335 |
| 5,209,178 A | * | 5/1993 | Rowe | 297/188.1 |
| 5,230,544 A | * | 7/1993 | Morritt et al. | 297/336 X |
| 5,347,799 A | | 9/1994 | Hosaka | 56/15.8 |
| 5,367,861 A | | 11/1994 | Murakawa | 56/11.8 |
| 5,678,649 A | | 10/1997 | Minoura | 180/68.3 |
| 5,911,471 A | * | 6/1999 | Benedict et al. | 297/188.09 X |

FOREIGN PATENT DOCUMENTS

| | | | |
|---|---|---|---|
| JP | 05076228 | 3/1993 | A01D/34/64 |
| WO | WO 98/09496 | 3/1998 | A01D/34/64 |

* cited by examiner

Primary Examiner—Peter M. Cuomo
Assistant Examiner—Rodney B. White
(74) Attorney, Agent, or Firm—Kevin E. Joyce

(57) ABSTRACT

A frame channel is provided for the mounting of an engine of a rear engine riding lawn mower. A platform is secured to the frame channel, the platform includes a portion which overlays the engine and which includes an opening therein. A seat-supporting hood normally overlays the opening. The hood is pivotally mounted to the platform whereby when the hood is pivoted to an open position to expose the platform opening, access to the engine is obtained.

27 Claims, 1 Drawing Sheet

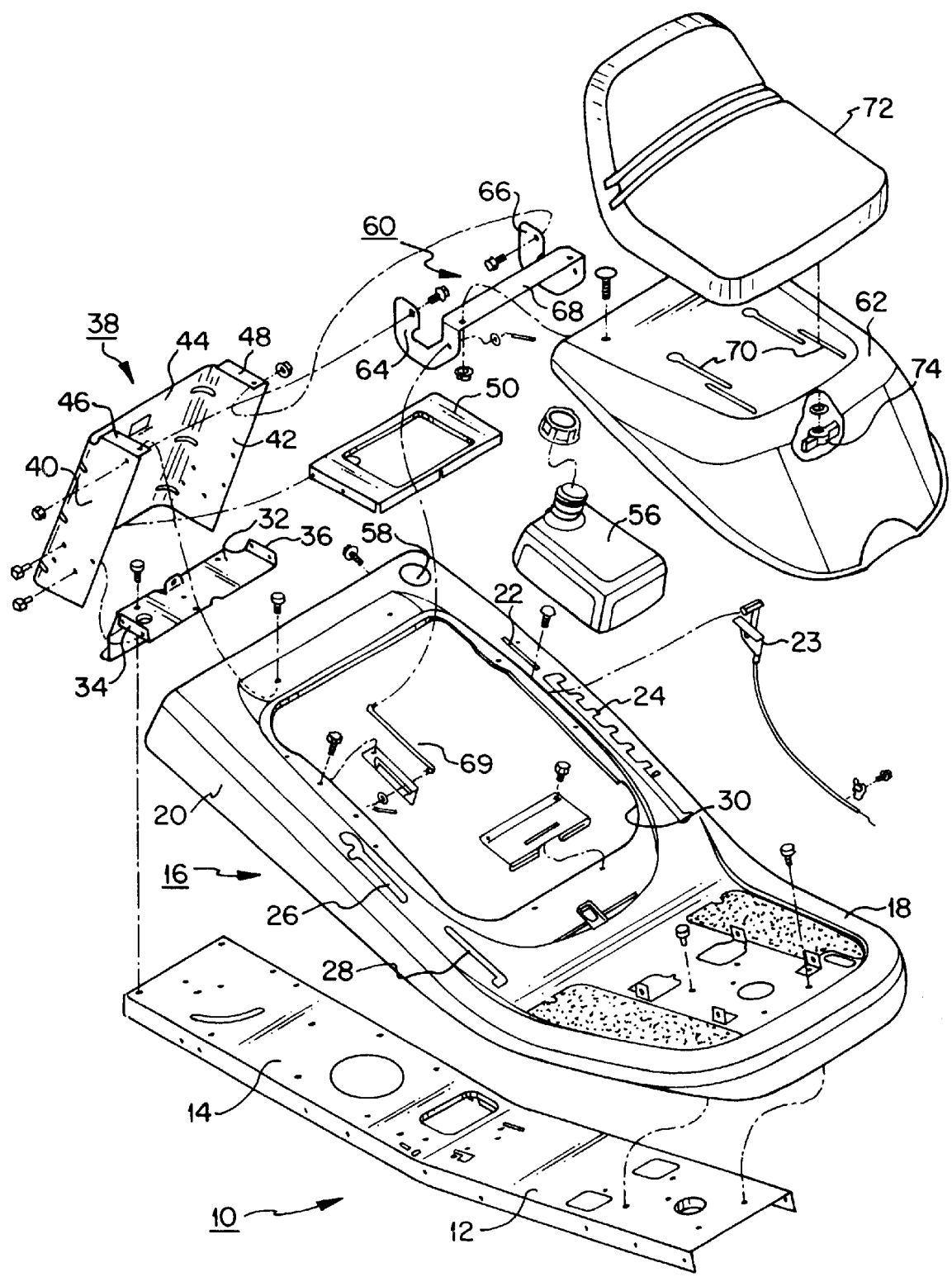

FRAME AND SEAT SUPPORT FOR A RIDING LAWN MOWER

This application claims the benefit of U.S. Provisional Application No. 60/224,215, filed Aug. 10, 2000.

BACKGROUND OF THE INVENTION

1. Field of the Invention

The present invention relates to an arrangement of components which constitute an improved frame and seat support subassembly for a riding lawn mower.

2. Prior Art

Riding lawn mowers typically include a frame for supporting the major operational components of the mower. These components include an engine, transaxle, wheels, steering assemblies and the like. In the case of mowers having engines mounted forwardly of the operator, a hood usually covers the engine. Access to the engine is achieved by opening the hood. For mowers provided with engines located near the rear of the mower, the engine frequently is situated beneath a seat provided for the operator. Thus arrangement creates a problem in that the engine normally is covered during operation but must be accessible for servicing. Conventional rear engine mowers of this type require that at least those support components which cover the seat be disassembled and removed to obtain significant access to the engine.

The present invention provides a simplified and improved structural arrangement for supporting the seat of a rear engine riding mower and providing ready access to an engine supported beneath the seat on a mower frame member.

SUMMARY OF THE INVENTION

A single piece frame channel is provided as a mount for the engine and transaxle of a riding lawn mower. A single piece mower platform is secured to the upper surface of the frame channel. A hood is pivotally mounted to the platform to overlay an opening in the platform beneath which the engine is mounted. The hood provides support for an adjustable operator's seat. When the hood is pivoted so as to expose the platform's opening, access to the engine is achieved.

BRIEF DESCRIPTION OF THE DRAWING

The invention will be described in greater detail with respect to the accompanying drawing which represents an exploded perspective view of the arrangement of components which constitute the invention.

DETAILED DESCRIPTION OF A PREFERRED EMBODIMENT OF THE INVENTION

Referring to the drawing, a frame channel member is generally indicated at 10. Member 10 comprises a single inverted U-shaped piece which is bent intermediate its ends to form a forward portion 12 and a rear portion 14 which meet at an obtuse angle. Portion 14 serves as a mount for an engine and transaxle (both not shown).

A single piece platform 16 overlies frame channel member 10. Platform 16 also is bent intermediate its ends to form a forward portion 18 and a rear portion 20. The forward portion is secured to the upper surface of the forward portion 12 of frame channel member 10. Portions 18 and 20 of the platform meet at an angle less obtuse than that formed where portions 12 and 14 of frame channel member 10 meet. The angular difference provides sufficient space between the respective rear portions 14 and 20 to receive the lawn mower engine and other operating components of the mower.

The forward portion 18 of platform 16 is dimensioned to support a steering column mounting (not shown) and the feet of the mower's operator. The rear portion 20 of platform 16 is provided with several cutouts on its upper surface. Cutout 22 receives an engine throttle control 23. Cutout 24 receives a control lever (not shown) for adjusting the height of a cutting deck (not shown) which houses the mower's blade. Cutout 26 receives a lever (not shown) for controlling the operation of the transaxle, and cutout 28 receives a control lever (not shown) which permits the operator to selectively actuate the mower blade. A further cutout 30 provides access to operational components mounted to the rear portion 14 of the frame channel member 10.

A plate 32 is secured to the rear end of frame channel member 10. Plate 32 is provided with upturned end portions 34 and 36 to which a rear support member 38 is attached. More particularly, member 38 is U-shaped having side panels 40 and 42 joined by a web 44. Panels 40 and 42 are secured to end portions 34 and 36 of plate 32. Additionally, panels 40 and 42 are bent at their upper ends to form tabs 46 and 48, respectively, which are secured to the upper surface of platform 16 rearwardly of opening 30. Member 38 thereby bridges frame channel member 10 and platform 16 at their rear ends to provide a structural link therebetween.

A tray 50 is secured between panels 40 and 42 to receive a battery (not shown) for operating the engine.

The neck of the fuel secured tank 56 projects through an opening 58 in the rear quarter of platform 16 and is secured with screws.

A hinge bracket 60 is provided for joining a hood 62 to platform 16. More particularly, bracket 60 has substantially C-shaped end portions 64 and 66 joined by a strap 68 extending between corresponding forward ends of portions 64 and 66. The rear ends of portions 64 and 66 are pivotally connected to respective panels 40 and 42 of member 38, and strap 68 is secured to the rear of hood 62.

The hood 62 is dimensioned to cover the opening 30 in platform 16. When so positioned, the operating components mounted above frame channel member 10 (i.e., the engine, battery, electrical system, etc.) are not accessible to the operator. However, because of the provision of hinge bracket 60, the hood can be lifted in a pivotal movement about the connection of bracket 60 to panels 40 and 42 of member 38. This permits the operator to obtain access to the aforesaid operating components. The hood is retained in an open position by a conventional latching arrangement 69 extending between platform 16 and bracket 60.

Hood 62 is provided with a substantially flat upper surface having longitudinally extending slots 70 for receiving mounting bolts (not shown) which project from the underside of an operator's seat 72. By providing one or more wing nuts 74 which are joined to the seat by projecting through slots 70, the seat 72 can be adjusted in forward and rear directions to suit the operator. Such adjustment is achieved by providing access to the wing nut(s) by lifting hood 62.

A conventional operator-presence switch (not shown) can be positioned between seat 72 and hood 62 or, if desired, between the hood and underlying structure, to sense when the operator's weight is applied to the seat and hood thereby allowing the engine to function.

The above-described invention provides an improved riding lawn mower frame and seat support assembly having a reduced number of components which provide structural soundness, ease of assembly, operator convenience and aesthetic opportunities for the overall design of the lawn mower.

What is claimed is:

1. A frame and seat support subassembly for a rear engine-type riding lawn mower, comprising:

a frame having a rear engine-mounting portion;

a platform secured to an upper surface of the frame, said platform including a rear portion disposed at an angle with respect to the frame so as to define an engine-occupying space between the rear engine-mounting portion of the frame and the rear portion of the platform;

an opening in said rear portion of the platform for providing access to the engine-occupying space;

a hood disposed on said platform in overlying relationship with respect to said opening, the hood being pivotally movable from a first position covering the opening to a second position exposing the opening; and a seat mounted on an upper surface of said hood.

2. A subassembly according to claim 1, wherein said frame comprises a channel member having a cross-section of a substantially inverted U-shape.

3. A subassembly according to claim 1, wherein said frame is bent intermediate its ends to form a forward portion and wherein said rear engine-mounting portion is angularly disposed relative to the forward portion.

4. A subassembly according to claim 3, wherein said seat is adjustably mounted on said hood so as to be selectively movable, in forward and reverse directions, to a desired position.

5. A subassembly according to claim 3, wherein said frame comprises a channel member having a cross-section of a substantially inverted U-shape.

6. A subassembly according to claim 3, wherein said rear portion of the platform is disposed at a greater angle to the frame than the angle between the forward and rear engine-mounting portions of the frame.

7. A subassembly according to claim 6, wherein said seat is adjustably mounted on said hood so as to be selectively movable, in forward and reverse directions, to a desired position.

8. A subassembly according to claim 6, wherein said frame comprises a channel member having a cross-section of a substantially inverted U-shape.

9. A subassembly according to claim 1, further comprising:

a support member extending between the rear engine-mounting portion of the frame and said rear portion of the platform.

10. A subassembly according to claim 9, wherein said seat is adjustably mounted on said hood so as to be selectively movable, in forward and reverse directions, to a desired position.

11. A subassembly according to claim 9, wherein said frame comprises a channel member having a cross-section of a substantially inverted U-shape.

12. A subassembly according to claim 9, wherein said frame is bent intermediate its ends to form a forward portion and wherein said rear engine-mounting portion is angularly disposed relative to the forward portion.

13. A subassembly according to claim 12, wherein said seat is adjustably mounted on said hood so as to be selectively movable, in forward and reverse directions, to a desired position.

14. A subassembly according to claim 12, wherein said frame comprises a channel member having a cross-section of a substantially inverted U-shape.

15. A subassembly according to claim 12, wherein said rear portion of the platform is disposed at a greater angle to the frame than the angle between the forward and rear engine-mounting portions of the frame.

16. A subassembly according to claim 15, wherein said seat is adjustably mounted on said hood so as to be selectively movable, in forward and reverse directions, to a desired position.

17. A subassembly according to claim 15, wherein said frame comprises a channel member having a cross-section of a substantially inverted U-shape.

18. A subassembly according to claim 9, wherein said hood is pivotally connected to said support member.

19. A subassembly according to claim 18, wherein said seat is adjustably mounted on said hood so as to be selectively movable, in forward and reverse directions, to a desired position.

20. A subassembly according to claim 18, wherein said frame comprises a channel member having a cross-section of a substantially inverted U-shape.

21. A subassembly according to claim 18, wherein said frame is bent intermediate its ends to form a forward portion and wherein said rear engine-mounting portion is angularly disposed relative to the forward position.

22. A subassembly according to claim 21, wherein said seat is adjustably mounted on said hood so as to be selectively movable, in forward and reverse directions, to a desired position.

23. A subassembly according to claim 21, wherein said frame comprises a channel member having a cross-section of a substantially inverted U-shape.

24. A subassembly according to claim 21, wherein said rear portion of the platform is disposed at a greater angle to the frame than the angle between the forward and rear engine-mounting portions of the frame.

25. A subassembly according to claim 24, wherein said seat is adjustably mounted on said hood so as to be selectively movable, in forward and reverse directions, to a desired position.

26. A subassembly according to claim 24, wherein said frame comprises a channel member having a cross-section of a substantially inverted U-shape.

27. A subassembly according to claim 1, wherein said seat is adjustably mounted on said hood so as to be selectively movable, in forward and reverse directions, to a desired position.

* * * * *